United States Patent
Schultz et al.

(10) Patent No.: US 10,908,360 B2
(45) Date of Patent: Feb. 2, 2021

(54) TWO CHANNEL IMAGING LIGHT GUIDE WITH DICHROIC REFLECTOR

(71) Applicant: Vuzix Corporation, West Henrietta, NY (US)

(72) Inventors: Robert J. Schultz, Victor, NY (US); Paul J. Travers, Honeoye Falls, NY (US)

(73) Assignee: Vuzix Corporation, West Henrietta, NY (US)

( * ) Notice: Subject to any disclaimer, the term of this patent is extended or adjusted under 35 U.S.C. 154(b) by 257 days.

(21) Appl. No.: 16/068,037

(22) PCT Filed: Jan. 5, 2017

(86) PCT No.: PCT/US2017/012311
§ 371 (c)(1),
(2) Date: Jul. 3, 2018

(87) PCT Pub. No.: WO2017/120320
PCT Pub. Date: Jul. 13, 2017

(65) Prior Publication Data
US 2020/0278498 A1    Sep. 3, 2020

Related U.S. Application Data

(60) Provisional application No. 62/275,549, filed on Jan. 6, 2016.

(51) Int. Cl.
*G02B 6/293*    (2006.01)
*G02B 6/42*    (2006.01)
(Continued)

(52) U.S. Cl.
CPC ..... *G02B 6/29328* (2013.01); *G02B 27/4233* (2013.01); *G02B 27/4272* (2013.01); *G02B 27/0172* (2013.01)

(58) Field of Classification Search
CPC .................................. G02B 6/293; G02B 6/42
(Continued)

(56) References Cited

U.S. PATENT DOCUMENTS 10,156,725 B2 * 12/2018 TeKolste .............. G02B 6/0026
2003/0165017 A1    9/2003 Amitai
(Continued)

FOREIGN PATENT DOCUMENTS

EP    2196729 A1    6/2010
JP    2003536102 A    12/2003
(Continued)

OTHER PUBLICATIONS

International Search Report for International Application No. PCT/US2017/012311 dated Mar. 13, 2017.
(Continued)

*Primary Examiner* — Kaveh C Kianni
(74) *Attorney, Agent, or Firm* — Thomas B. Ryan; Jacob D. Merrill, Esq.; Harter Secrest & Emery LLP

(57) ABSTRACT

An imaging light guide for conveying a virtual image has a waveguide with first and second color channels for directing light of a first and second wavelength range toward a viewer eyebox. Each color channel has an in-coupling diffractive optic to diffract an image-bearing light beam into the waveguide and a reflector array having a partially reflective surface and a dichroic filter surface in parallel. Reflector array surfaces expand the respective light beam of the channel from the in-coupling diffractive optic in a first dimension and direct the expanded light beams toward an out-coupling diffractive optic. The dichroic surface reflects light of the color channel toward the reflective surface and transmits other light out of the waveguide. The out-coupling diffractive optic expands the image-bearing light beam
(Continued)

orthogonally to the first dimension and directs the further expanded light beam toward the viewer eyebox.

15 Claims, 14 Drawing Sheets

(51) Int. Cl.
*G02B 27/42* (2006.01)
*G02B 27/01* (2006.01)

(58) Field of Classification Search
USPC .......................................................... 385/24
See application file for complete search history.

(56) References Cited

U.S. PATENT DOCUMENTS

| | | | |
|---|---|---|---|
| 2010/0201953 A1 | 8/2010 | Freeman et al. | |
| 2010/0214659 A1 | 8/2010 | Levola | |
| 2012/0062998 A1* | 3/2012 | Schultz | B29D 11/00663 359/630 |
| 2013/0051730 A1* | 2/2013 | Travers | G02B 27/0081 385/37 |
| 2013/0120815 A1* | 5/2013 | Aspnes | G03H 1/202 359/15 |
| 2014/0218801 A1 | 8/2014 | Simmonds | |
| 2014/0300966 A1* | 10/2014 | Travers | G03H 1/2205 359/558 |
| 2015/0309263 A2* | 10/2015 | Abovitz | G02B 30/26 385/37 |
| 2018/0231771 A1* | 8/2018 | Schuck, III | G02B 6/0016 |
| 2020/0278498 A1* | 9/2020 | Schultz | G02B 27/4272 |

FOREIGN PATENT DOCUMENTS

| | | |
|---|---|---|
| JP | 2009186794 A | 8/2009 |
| JP | 2015053163 A | 3/2015 |
| JP | 2015145973 A | 8/2015 |
| WO | 2016/112130 A1 | 7/2016 |

OTHER PUBLICATIONS

International Written Opinion for International Application No. PCT/US2017/012311 dated Mar. 13, 2017.
Japanese Patent Office (JPO), Office Action from JP Patent Application No. 2018-533876 dated Jul. 30, 2019 with English language translation.
European Patent Office (EPO), Extended European Search Report from EP Patent Application No. 17736320.7 dated Jun. 28, 2019.
China National Intellectual Property Administration (CNIPA), Office Action from CN Patent Application No. 201780015387.X dated Nov. 5, 2019 with English language translation.

* cited by examiner

TWO CHANNEL IMAGING LIGHT GUIDE WITH DICHROIC REFLECTOR

TECHNICAL FIELD

This invention generally relates to optical light guides for conveying image-bearing light in multiple color channels to a viewer particularly for use in video eyewear or augmented or virtual reality near-eye displays.

BACKGROUND OF THE INVENTION

Head-Mounted Displays (HMDs), which include near eye displays in a form resembling conventional eyeglasses or sunglasses, are being developed for a range of diverse uses, including military, commercial, industrial, fire-fighting, and entertainment applications. For many of these applications, there is particular value in forming a virtual image that can be visually superimposed over the real-world image that lies in the field of view of the HMD user. Light guides incorporating various types of waveguides, relay image-bearing light to a viewer in a narrow space, acting as exit-pupil expanders for redirecting the virtual image to the viewer's pupil and enabling this superposition function.

In the conventional light guide, collimated angularly related light beams from an image source are coupled into the light guide substrate, generally referred to as a waveguide, by an input optical coupling such as an in-coupling diffraction grating, which can be formed on a surface of the substrate or buried within the substrate. Other types of diffractive optics could be used as input couplings, including diffractive structures formed of alternating materials of variable index such as holographic polymer dispersed liquid crystal (HPDLC) or volume holograms. The diffractive optics could also be formed as surface relief diffraction gratings. The collimated light beams can be directed out of the waveguide by a similar output optical coupling, which can also take the form of a diffractive optic. The collimated angularly related beams ejected from the waveguide overlap at an eye relief distance from the waveguide forming an exit pupil within which a virtual image generated by the image source can be viewed. The area of the exit pupil through which the virtual image can be viewed at the eye relief distance is referred to as an "eyebox."

The output coupling can also be arranged for enlarging the exit pupil. For example, the collimated beams can be enlarged in one dimension by offsetting partially reflected portions of the collimated beams in a direction at which the collimated beams propagate along the output coupling or by ejecting collimated beams of different angles from different positions along the waveguide to more efficiently overlap the collimated beams at the eye relief distance from the waveguide.

A so-called "turning optic" located along the waveguide between the input coupling and the output coupling, can be used for expanding pupil size in a second dimension. The expansion can be effected by offsetting reflected portions of the collimated beam to enlarge a second dimension of the beams themselves or by directing the collimated beams to different areas of the output coupling so the collimated beams of different angles are ejected from different positions to more efficiently overlap within the eyebox. The turning optic can also take the form of a diffractive optic and, especially when located between the diffraction gratings of the input coupling and output coupling, can also be referred to as an intermediate grating.

Although conventional light guide mechanisms have provided a significant reduction in bulk, weight, and overall cost of display optics, there are still issues to resolve. Suitable separation of color channels is needed in order to prevent cross-talk, in which color is processed and displayed from the wrong color channel. Cross-talk can lead to disparity between the color image data and the displayed color, and can also be a cause of objectionable color shifts, perceptible across the image field. Attempts to correct this problem have included stacking approaches in which multiple waveguides are stacked together with optional filters to prevent color from being directed to the wrong channel. Stacking, however, leads to thicker devices, adds weight, reduces brightness, and has not provided highly satisfactory results.

Thus, it can be appreciated that there is a need for improved designs that still provide the pupil expansion capabilities of the optical light guide, but allow these devices to be thinner and more lightweight, without compromising image quality and color balance.

SUMMARY OF THE INVENTION

It is an object of the present disclosure to advance the art of image presentation when using compact head-mounted devices and similar imaging apparatus. Advantageously, embodiments of the present disclosure provide a double-sided beam expander capable of handling two color channels within a single thickness of substrate.

These and other aspects, objects, features and advantages of the present invention will be more clearly understood and appreciated from a review of the following detailed description of the preferred embodiments and appended claims, and by reference to the accompanying drawings.

According to an aspect of the present disclosure, there is provided an imaging light guide for conveying a virtual image including a waveguide, a first color channel for directing light of a first wavelength range along the waveguide toward a viewer eyebox, and a second color channel for directing light of a second wavelength range along the waveguide toward the viewer eyebox. Each color channel includes an in-coupling diffractive optic, a reflector array, and an out-coupling diffractive optic. The in-coupling diffractive optic is disposed to diffract image-bearing light beams into the waveguide. The reflector array has at least one partially reflective surface and a dichroic filter surface in parallel with the at least one partially reflective surface. The surfaces of the reflector array are disposed to expand the respective image-bearing light beams of the color channel from the in-coupling diffractive optic in a first dimension and to direct the expanded image-bearing light beams toward an out-coupling diffractive optic. The out-coupling diffractive optic is disposed to further expand the image-bearing light beams of the color channel in a second dimension and to direct the further expanded image-bearing light beams of the color channel from the waveguide toward the viewer eyebox.

Preferably, the dichroic filter surface is formed to reflect light of the color channel toward the at least one partially reflective surface and to transmit other light. The out-coupling diffractive optic of the first color channel and the out-coupling diffractive optic of the second color channel are preferably formed on opposite surfaces of the waveguide and are preferably aligned along a common normal to the opposite surfaces. In contrast, the reflector array of the first color channel and the reflector array of the second color channel are preferably disposed in different positions in the waveguide.

BRIEF DESCRIPTION OF THE DRAWING FIGURES

While the specification concludes with claims particularly pointing out and distinctly claiming the subject matter of the present invention, it is believed that the invention will be better understood from the following description when taken in conjunction with the accompanying drawings.

DETAILED DESCRIPTION OF THE INVENTION

Figure 1:
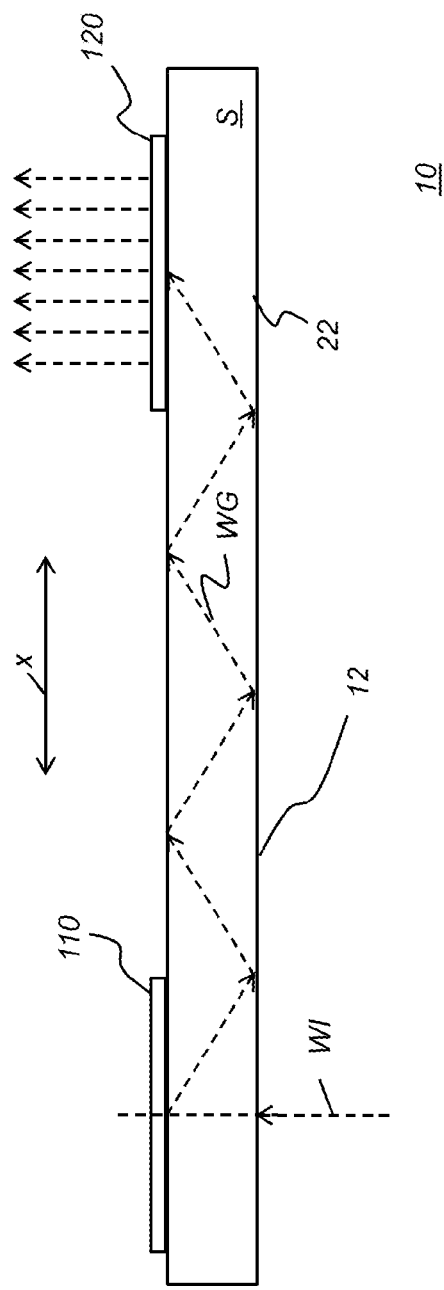
FIG. 1 is a schematic diagram that shows a simplified cross-sectional view of one possible configuration of a light guide arranged as waveguide incorporating a monocular type diffractive beam expander.

The present description is directed in particular to elements forming part of, or cooperating more directly with, apparatus in accordance with the invention. It is to be understood that elements not specifically shown or described may take various forms well known to those skilled in the art.

Where they are used herein, the terms "first", "second", and so on, do not necessarily denote any ordinal, sequential, or priority relation, but are simply used to more clearly distinguish one element or set of elements from another, unless specified otherwise. The terms "top" and "bottom" do not necessarily designate spatial position but provide relative information about a structure, such as to distinguish opposing surfaces of a planar (flat) waveguide.

In the context of the present disclosure, the terms "viewer", "operator", "observer", and "user" are considered to be equivalent and refer to the person who wears the HMD viewing device.

As used herein, the term "energizable" relates to a device or set of components that perform an indicated function upon receiving power and, optionally, upon receiving an enabling signal.

The term "actuable" has its conventional meaning, relating to a device or component that is capable of effecting an action in response to a stimulus, such as in response to an electrical signal, for example.

The term "set", as used herein, refers to a non-empty set, as the concept of a collection of elements or members of a set is widely understood in elementary mathematics. The term "subset", unless otherwise explicitly stated, is used herein to refer to a non-empty proper subset, that is, to a subset of the larger set, having one or more members. For a set S, a subset may comprise the complete set S. A "proper subset" of set S, however, is strictly contained in set S and excludes at least one member of set S.

In the context of the present disclosure, the term "oblique" means at an angle that is not an integer multiple of 90 degrees. Two lines, linear structures, or planes, for example, are considered to be oblique with respect to each other if they diverge from or converge toward each other at an angle that is at least about 5 degrees or more away from parallel, or at least about 5 degrees or more away from orthogonal.

In the context of the present disclosure, the terms "wavelength band" and "wavelength range" are equivalent and have their standard connotation as used by those skilled in the art of color imaging and refer to a range of light wavelengths that are used to form one or more colors in polychromatic images. Different wavelength bands are directed through different color channels, such as to provide red, green, and blue primary colors in conventional color imaging applications.

As an alternative to real image projection, an optical system can produce a virtual image display. In contrast to methods for forming a real image, a virtual image is not formed on a display surface. That is, if a display surface were positioned at the perceived location of a virtual image, no image would be formed on that surface. A virtual image display has a number of inherent advantages for an augmented reality display. For example, the apparent size of a virtual image is not limited by the size or location of a display surface. Additionally, the source object for a virtual image may be small; a magnifying glass, as a simple example, provides a virtual image of its object. In comparison with systems that project a real image, a more realistic viewing experience can be provided by forming a virtual image that appears to be some distance away. Providing a virtual image also obviates any need to compensate for screen artifacts, as may be necessary when projecting a real image.

In the context of the present disclosure, the term "coupled" is intended to indicate a physical association, connection, relation, or linking, between two or more components, such that the disposition of one component affects the spatial disposition of a component to which it is coupled. For mechanical coupling, two components need not be in direct contact, but can be linked through one or more intermediary components. A component for optical coupling allows light energy to be input to, or output from, an optical apparatus. The terms "beam expander" and "pupil expander" are considered to be synonymous, used interchangeably herein.

FIG. 1 is a schematic diagram that shows a simplified cross-sectional view of one conventional configuration of a light guide 10 arranged as a monocular type light diffractive beam expander or exit pupil expander comprising an input coupling element such as an in-coupling diffractive optic 110, and an output coupling element, such as an out-coupling diffractive optic 120 arranged on a transparent and planar waveguide 22 having a substrate S. In this example, in-coupling diffractive optic 110 is shown as a reflective type diffraction grating; however, in-coupling diffractive optic 110 could alternately be a transmissive diffraction grating, volume hologram or other holographic diffraction element, or other type of optical component that provides diffraction for the incoming, image-bearing light, arranged on a lower surface 12 of the waveguide substrate S, where the incoming light wave WI first interacts with the waveguide substrate S.

When used as a part of a virtual display system, in-coupling diffractive optic 110 couples each of a plurality of angularly related in-coming image-bearing light beams WI from an imager, such as a projector apparatus, via suitable front end optics (not shown), into the substrate S the waveguide 22. The input light beams WI are diffracted by in-coupling diffractive optic 110. For example, first order diffracted light propagates as an angularly related set of beams WG along the substrate S, moving toward the right in the FIG. 1 system, toward out-coupling diffractive optic 120. Between gratings or other types of diffractive optics, light is channeled or directed along the waveguide 22 by Total Internal Reflection (TIR). Out-coupling diffractive optic 120 contributes to beam expansion via multiple diffractive encounters with the propagating light beams WG along its length, i.e., along the x-axis in the view of FIG. 1, and directs the diffracted light from each encounter outwards towards the intended location of an observer's eye.

Figure 2:
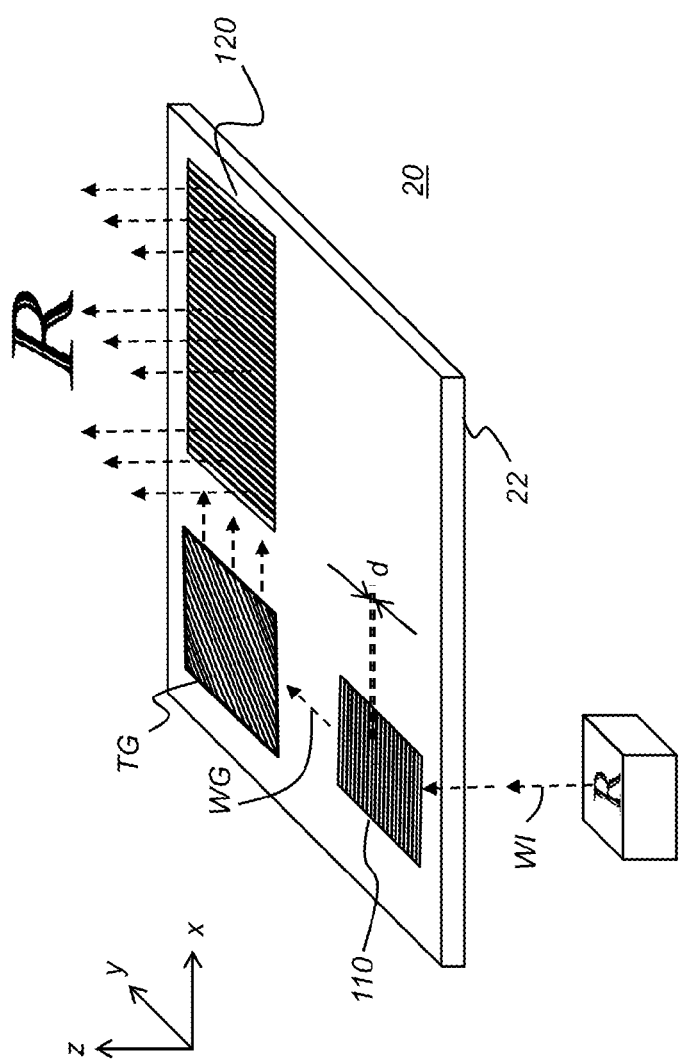
FIG. 2 is a perspective view that shows a light guide arranged as waveguide incorporating a diffractive beam expander including a turning grating.

The perspective view of FIG. 2 shows an imaging light guide 20 arranged as a known beam expander that provides beam expansion with respect to both x- and y-axes using an intermediate turning grating TG to redirect the light output (first diffracted mode) from in-coupling diffractive optic 110 to out-coupling diffractive optic 120. In the FIG. 2 device, in-coupling diffractive optic 110 containing periodic rulings with a period d diffracts angularly related incoming input optical beams WI into the waveguide 22 as a set of angularly related beams WG, propagating by total internal reflection in an initial direction towards the intermediate turning grating TG. Intermediate grating TG is termed a "turning grating" because of its function in the optical path, redirecting the beams WG from within the waveguide 22 according to its grating vector in a direction towards the out-coupling diffractive optic 120, thereby accounting for a difference in angle between the grating vectors of the in-coupling diffraction optic 110 and the out-coupling diffraction optic 120. Intermediate grating TG, which has angular orientation of diffraction elements and a spacing geometry determined by spacing period d, not only redirects the internally reflected beams WG but also contributes to beam expansion via multiple diffractive encounters with the light beams WG along the initial direction of propagation, i.e., along the y-axis in the view of FIG. 2. The out-coupling diffractive optic 120 contributes to an orthogonal beam expansion via multiple diffractive encounters with the light beams WG along the redirected direction of propagation, i.e., along the x-axis in the view of FIG. 2.

The grating vectors, generally designated k and shown with subscripts where they are specific to light within a color channel, extend parallel to the plane of the waveguide surface and are in the direction of the periodicity of the in-coupling and out-coupling diffractive optics 110 and 120, respectively.

In considering a light guide design used for imaging it should be noted that image-bearing light traveling within a waveguide is effectively encoded by the in-coupling optics, whether the in-coupling mechanism uses gratings, holograms, prisms, mirrors, or some other mechanism. Any reflection, refraction, and/or diffraction of light that takes place at the input must be correspondingly decoded by the output in order to re-form the virtual image that is presented to the viewer.

A turning grating TG, placed at an intermediate position between the input and output couplings, such as the in-coupling and out-coupling diffractive optics 110 and 120, is typically chosen to minimize any changes on the encoded light. As such, the pitch of the turning grating preferably matches the pitch of the in-coupling and out-coupling diffractive optics 110 and 120. In addition, the virtual image can be preserved by orienting the turning grating at around 60 degrees to in-coupling and out-coupling diffractive optics 110 and 120 in such a way that the encoded ray bundles are turned 120 degrees by one of the 1st reflection orders of the turning grating TG. The diffractive effects of the turning grating TG are most pronounced on the vector component of the incoming rays that are parallel to the grating vector of the turning grating. Turning gratings so arranged redirect ray bundles within the guide substrate while minimizing any changes to the encoded angular information of the virtual image. The resultant virtual image in such a designed system is not rotated. If such a system did introduce any rotation to the virtual image, the rotational effects could be non-uniformly distributed across different field angles and wavelengths of light, thus causing unwanted distortions or chromatic aberrations in the resultant virtual image.

The use of turning grating TG preserves an inherent geometrical accuracy to the design of the light guide 20 so that the input beam and output beam are symmetrically oriented with respect to each other. With proper grating TG spacing and orientation, grating vectors k direct the light from the in-coupling diffractive optic 110 to the out-coupling diffractive optic 120. It should be noted that the image that is formed for the imaging light guide viewer is a virtual image, focused at infinity or at least well in front of the light guide 20, but with the relative orientation of output image content to input image content preserved. A change in the rotation about the z axis or angular orientation of incoming light beams WI with respect to the x-y plane can cause a corresponding symmetric change in rotation or angular orientation of outgoing light from out-coupling diffractive optic (ODO) 120. From the aspect of image orientation, turning grating TG is intended to function as a type of optical relay, providing expansion along one axis of the image that is input through the in-coupling diffractive optic (IDO) 110 and redirected to out-coupling diffractive optic (ODO) 120. Turning grating TG is typically a slanted or square grating or, alternately, can be a blazed grating. Reflective surfaces can alternately be used for turning the light toward the out-coupling diffractive optic 120.

Beam expansion in two different dimensions is provided when using the arrangement of FIG. 2. Turning grating TG expands the diffracted beam from in-coupling diffractive optic 110 in the y direction as shown. Out-coupling diffractive optic 120 further expands the diffracted beam in the x direction that is orthogonal to the y direction as shown. The combination of beam expansion by both turning grating TG and out-coupling diffractive optic 120 effectively expands the beam with respect to both the x- and y-axes lying in the plane of the waveguide substrate.

The known imaging light guide 20 that is shown in FIG. 2 has been used in a number of existing head-mounted device (HMD) designs for providing image content to a viewer. This type of beam expander is particularly well-suited to augmented reality applications in which image content can be superimposed on a real-world view as seen through the transparent imaging light guide.

One acknowledged shortcoming of the known imaging light guide beam expander relates to color quality. By design, a diffraction grating is optimized for a particular wavelength, with progressively degrading imaging performance as wavelengths deviate further from the specified wavelength. Moreover, not only does performance shift according to wavelength, but changes in incident angle have more pronounced effects that vary with wavelength differences. Because of this, undesirable color shifts can be perceived across an image field when using the known type of diffractive beam expander. The color shift problem proves extremely difficult to compensate for in software, since the amount of color shift can vary widely across the image field.

One approach for addressing the color shift problem is using separate waveguides to serve the different primary color channels, with diffraction elements suitably designed for handling light of different wavelength bands. One proposed approach stacks three waveguides to effect beam expansion. Stacking can be used to delegate the separate red (R), blue (B), and green (G) color channels to individual waveguides, wherein the diffractive components for each waveguide are designed suitably for light of different wavelength bands. Cross-talk between color channels is reduced using stacked waveguides with separate diffraction gratings and optional color filters.

While stacking approaches can achieve some measure of channel separation, the added weight, size, complexity, and cost of stacked waveguide solutions can be significant. It can readily be appreciated that solutions that would provide separate color channels within a single waveguide, without appreciable color channel crosstalk, would be advantageous for helping to reduce color shifts and improve color quality overall.

Angular performance of the turning gratings can be limiting. The turning gratings, when designed correctly, can at best be an ideal solution for a single field angle and at a single wavelength. The efficiency curve for the reflective refractive order that actually redirects the light has similar characteristics to those for the in-coupling and out-coupling diffractive optics. A ray of the design wavelength and at a central field angle propagating through the system is efficiently in-coupled (diffractive optic 110), efficiently turned and expanded in one dimension (grating TG), and efficiently out-coupled and expanded in the orthogonal dimension (diffractive optic 120). A similar ray of the same wavelength, but from an extreme field point, would conversely be less efficiently coupled in, less efficiently turned, and less efficiently coupled out. This leads to difficulty in balancing performance, color balance, and brightness across the full angular field.

Conventional hand-held projection devices, such as pico-projectors for example, typically provide image content with a 9:16 height-to-width aspect ratio. Angular range limitations of the conventional imaging light guide design, in turn, constrain the allowed orientation of projector devices, typically preventing compact packaging of pico-projector devices in an HMD, for example. As a further constraint, overall light efficiency is limited, as was noted previously.

Embodiments of the present disclosure provide an optical system for forming a virtual image with an enlarged view pupil or eyebox. The optical system includes an imaging light guide in the form of a single planar waveguide component that has (i) an in-coupling element, such as an in-coupling diffractive optic 110, for accepting incident image-bearing light beams and directing at least the first order diffracted light from the incident light beams along the planar component using TIR; (ii) an out-coupling element, such as an out-coupling diffractive optic 120, for expanding the respective image-bearing light beams in a first dimension and directing the image-bearing light beams outward to form the virtual image; and (iii) a reflector array having at least first and second parallel reflective surfaces, differing from each other in reflectivity, that expand the respective image-bearing light beams with respect to a second dimension, preferably orthogonal to the first dimension and are disposed at an angle that directs the diffracted light from the in-coupling diffractive optic toward the out-coupling diffractive optic for forming the virtual image. Where diffractive optics are used, the in-coupling and out-coupling diffractive optics 110 and 120, respectively, preferably have the same diffraction period (pitch).

Figure 3:
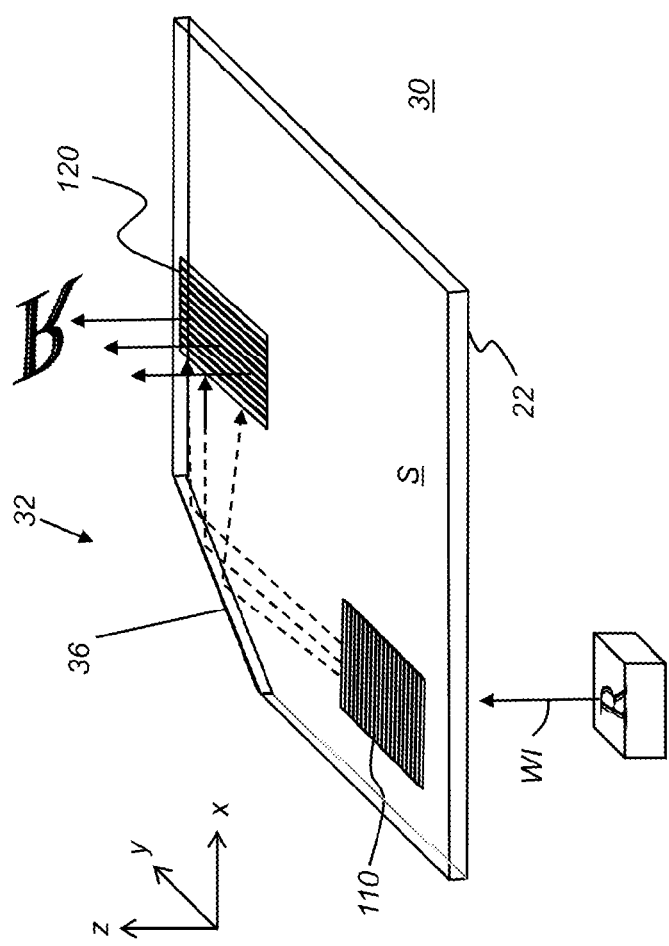
FIG. 3 is a perspective view of an imaging light guide arranged as a hybrid 1-D beam expander using in-coupling and out-coupling diffractive optics and a reflector for turning the beams, according to an embodiment of the present disclosure.

To help boost the overall efficiency of an imaging light guide beam expander, embodiments of the present disclosure use one or more reflective surfaces encased within, appended to, or otherwise formed as a part of the waveguide substrate to perform the turning and beam expanding function with respect to the y axis. As a first exemplary embodiment, FIG. 3 shows a light guide 30 arranged as a beam expander on a waveguide substrate S that uses a reflector 36 for turning the image-bearing light beams. Reflector 36 is formed within or along an outer edge of light guide 30, disposed at an appropriate angle to the grating vectors in the direction of the periodicity of the in-coupling and out-coupling diffractive optics 110 and 120, respectively, to provide an appropriate optical connection. According to an embodiment of the present disclosure, reflector 36 reflects light that is nominally parallel to the grating vector of in-coupling diffractive optic 110 so that the reflected light is, in turn, nominally parallel to the grating vector of out-coupling diffractive optic 120. Dashed lines show light paths for the diffracted first order light within the imaging light guide. As the dashed lines indicate, reflector 36 changes the orientation of the virtual image, effectively reversing the virtual image content and rotating the image at twice the incidence angle of the central field chief ray at the reflector, as shown by the letter 'R' in this figure. As noted, pupil expansion is effected in one dimension only in the FIG. 3 arrangement using the out-coupling diffractive optic 120.

Figure 4:
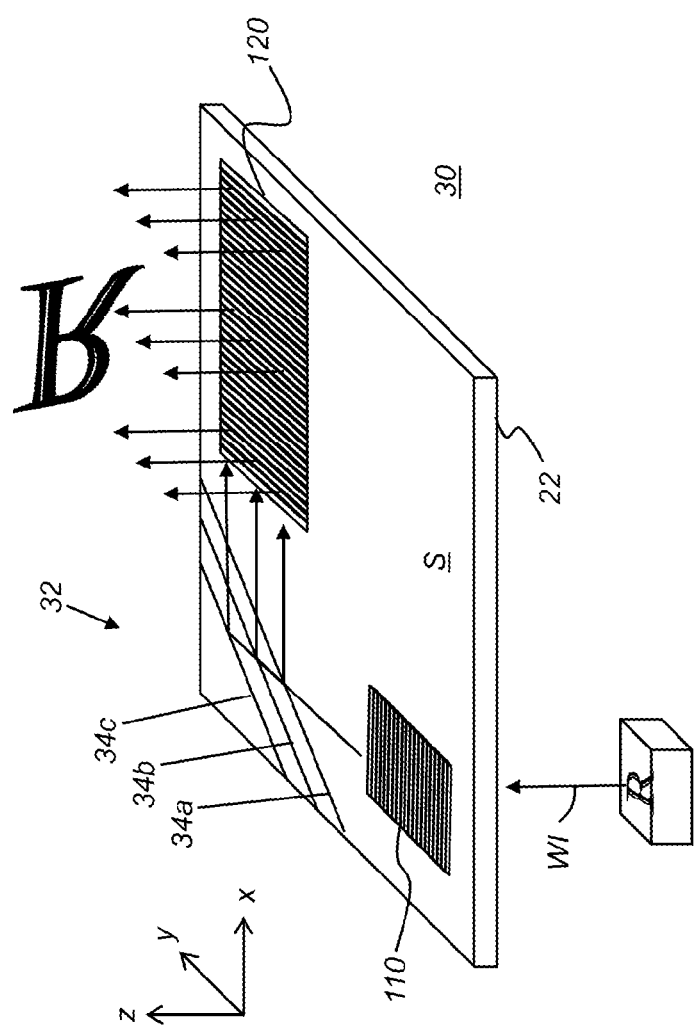
FIG. 4 is a perspective view of an imaging light guide arranged as a hybrid 2-D beam expander using in-coupling and out-coupling diffractive optics and an array of reflectors for turning the beams, according to an embodiment of the present disclosure.

FIG. 4 is a perspective view that shows a light guide 30 arranged as a beam expander with in-coupling and out-coupling diffractive optics 110 and 120 respectively, as described with reference to FIGS. 2 and 3 and using a reflector array 32 for adding a second dimension of beam expansion. An arrangement of this type expands the output light beams in the x and y directions. Reflector array 32 has three specularly reflective surfaces, shown in the FIG. 4 embodiment as reflectors 34a, 34b, and 34c. Some of the specularly reflective surfaces in the array are partially reflective, so that some of the light incident on reflector 34a is transmitted through to reflector 34b; similarly, some of the light incident on reflector 34b is transmitted through to reflector 34c. Reflectivity increases for successive reflectors in the array as the reflectors are further separated from the in-coupling or out-coupling diffractive optics 110, 120. The last or rearmost reflector in the series, reflector 34c in the example of FIG. 4, generally has a nominal reflectance of 100% for the desired light and transmits unwanted light out of the waveguide.

In order to provide a uniform distribution of the light in the expanded pupil, the successive reflectors 34a, 34b, and 34c of reflector array 32 can have different amounts of reflectivity or, conversely, different amounts of transmittance. Exemplary values for a five-reflector embodiment, with no absorption, are given in the following table.

TABLE

Exemplary Reflectivity for 5-Reflector Array

| Reflector | Reflectivity | Transmissivity |
| --- | --- | --- |
| 1 | 12% | 88% |
| 2 | 16% | 84% |
| 3 | 23% | 77% |
| 4 | 38% | 62% |
| 5 | 100% | — |

Figure 5A:
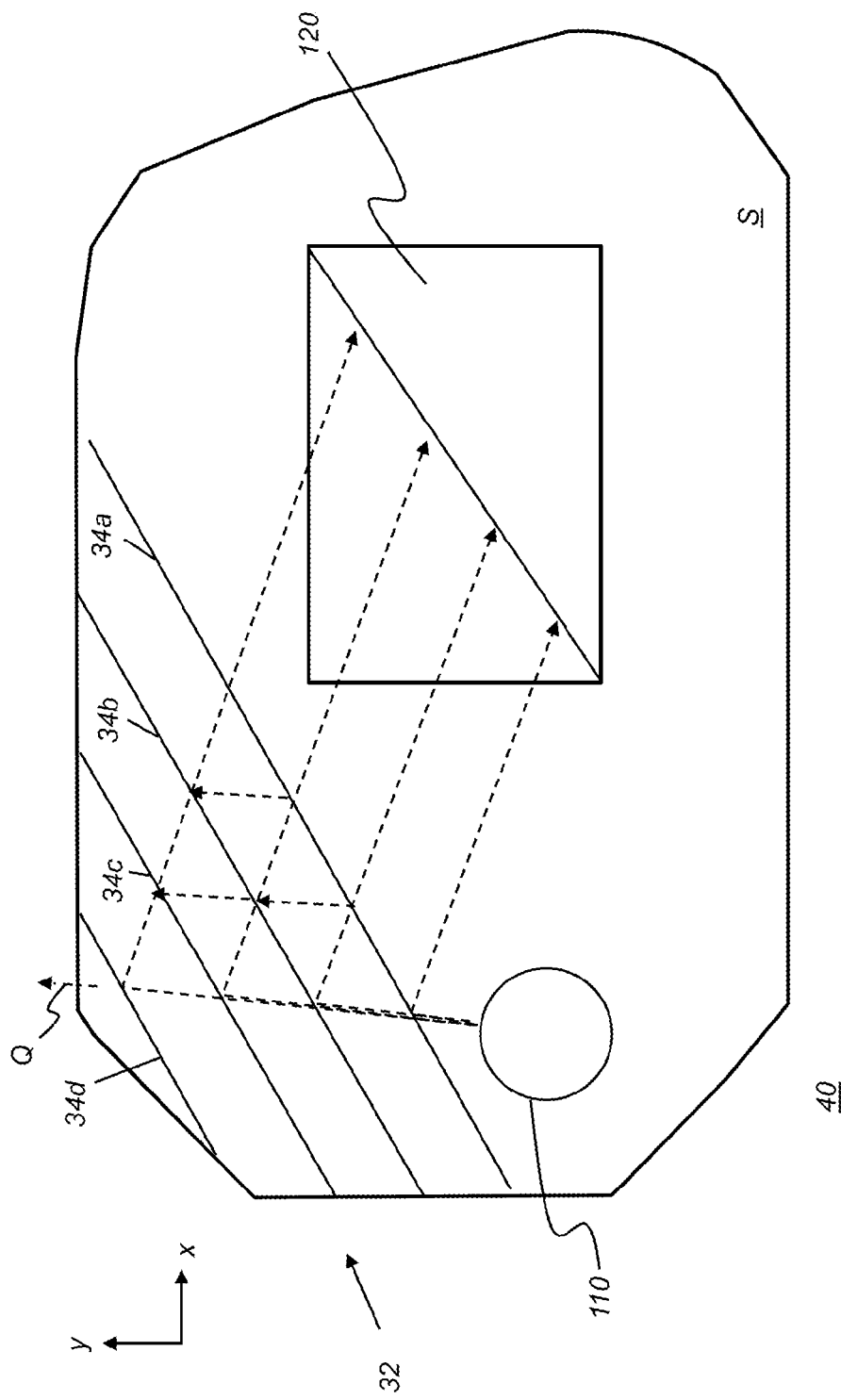
FIG. 5A is a plan view showing an imaging light guide that provides a beam expander using a reflector array.

FIG. 5A is a plan view of a light guide 40 arranged as a beam expander that traces the axial light paths for central field points from in-coupling diffractive optic 110 to out-coupling diffractive optic 120 when using reflector array 32. In the example of FIG. 5A, reflector array 32 has four reflective surfaces, shown as reflectors 34a, 34b, 34c, and 34d. Reflector 34d reflects only light that is within the intended band of wavelengths. Light that is outside the intended band of wavelengths transmits through surface 34d and out of the waveguide, as shown at Q in FIG. 5A. Thus, reflector 34d serves as a type of filter for removing unwanted wavelengths from the imaging channel.

According to the embodiment of FIG. 5A, beam expansion takes place not only due to the reflections of light transmitted to the reflectors 34a, 34b, 34c, and 34d, but also because portions of the reflected light are further reflected by the reflectors 34a, 34b, 34c, and 34d. Thus, the same light can encounter the same individual reflectors 34a, 34b, 34c, and 34d multiple times under conditions of transmission or reflection. Some of these reflections are shown. As also shown in FIG. 5A, reflectors 34a, 34b, and 34c also partially reflect light reflected from the other reflectors, so that diminishing portions of the light propagate between each combination of parallel reflective surfaces. The reflectivity designated for each of the respective surfaces accounts for these additional reflections. It can also be noted that there will be some inevitable losses due to absorption as well as due to light propagation beyond the reflectors themselves or the target output to the out-coupling diffractive optic 120.

The spacing between the reflective surfaces of reflectors 34a, 34b, 34c, and 34d is another consideration for maintaining the desired intensity profile throughout each of the expanded beams. For example, one would not want to split an individual (pixel) beam into beamlets that are deflected beyond a region of proximate overlap with adjacent beamlets to avoid gaps or brightness variations in the image viewable within the eyebox. Proper reflectivity and spacing between reflective surfaces can also produce a desired distribution of energy across the expanded individual (pixel) beams composed of the multiple beamlets. In general, the distance between reflector surfaces should not exceed about 2.5 times the thickness of the guide substrate S.

Figure 5B:
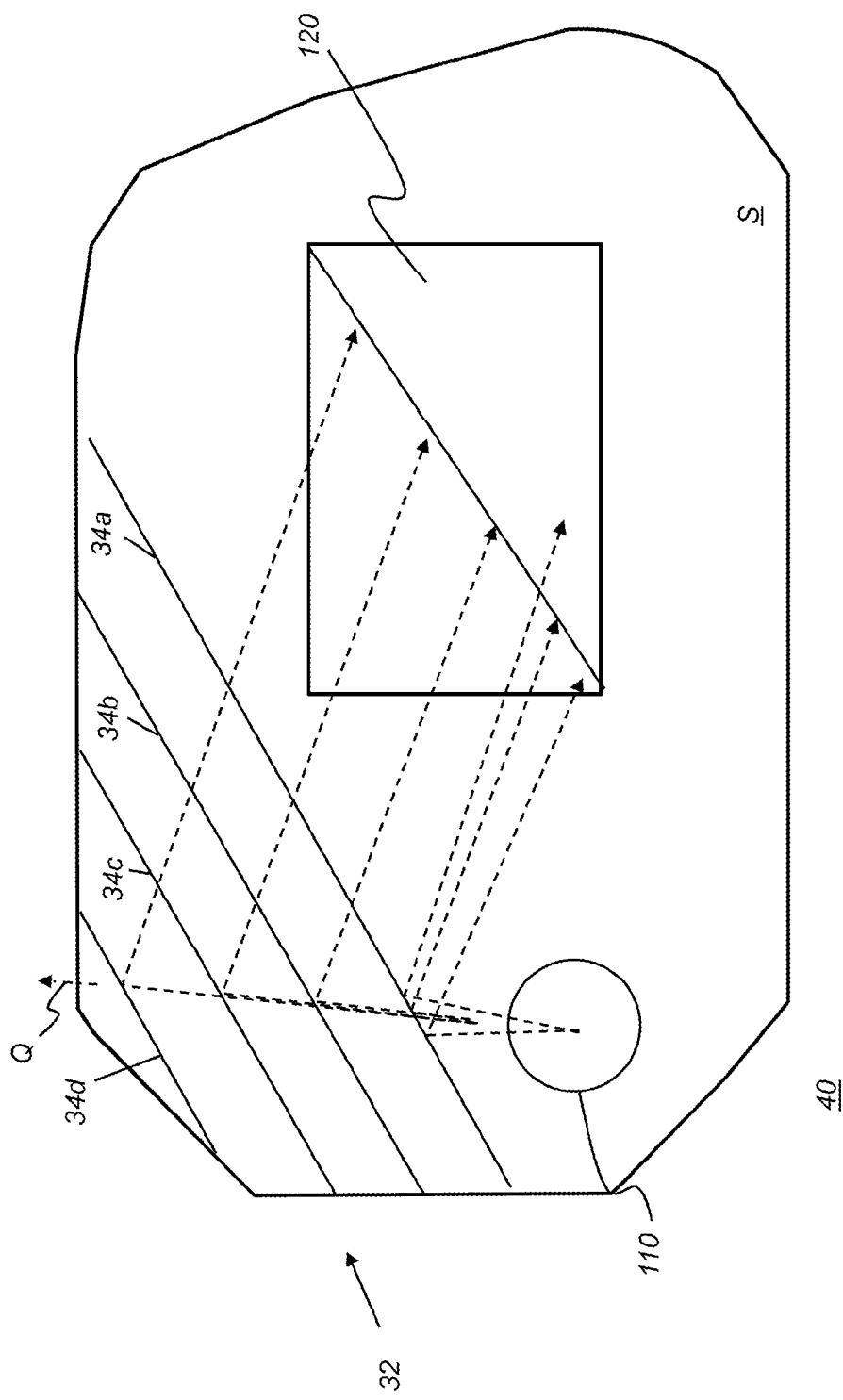
FIG. 5B is a plan view showing an imaging light guide that provides a beam expander using a reflector array and also showing an expanded portion of the field points of an image.

FIG. 5B is a plan view of the light guide 40 arranged as a beam expander and redrawn to show redirection of field points spaced away from the central field point. The same angular incidence of the light applies for each of reflectors 34a, 34b, 34c, and 34d. Thus, the relative angular relationships between the image-bearing beams are preserved by the reflections among the parallel surfaces of the reflectors.

Figure 6A:
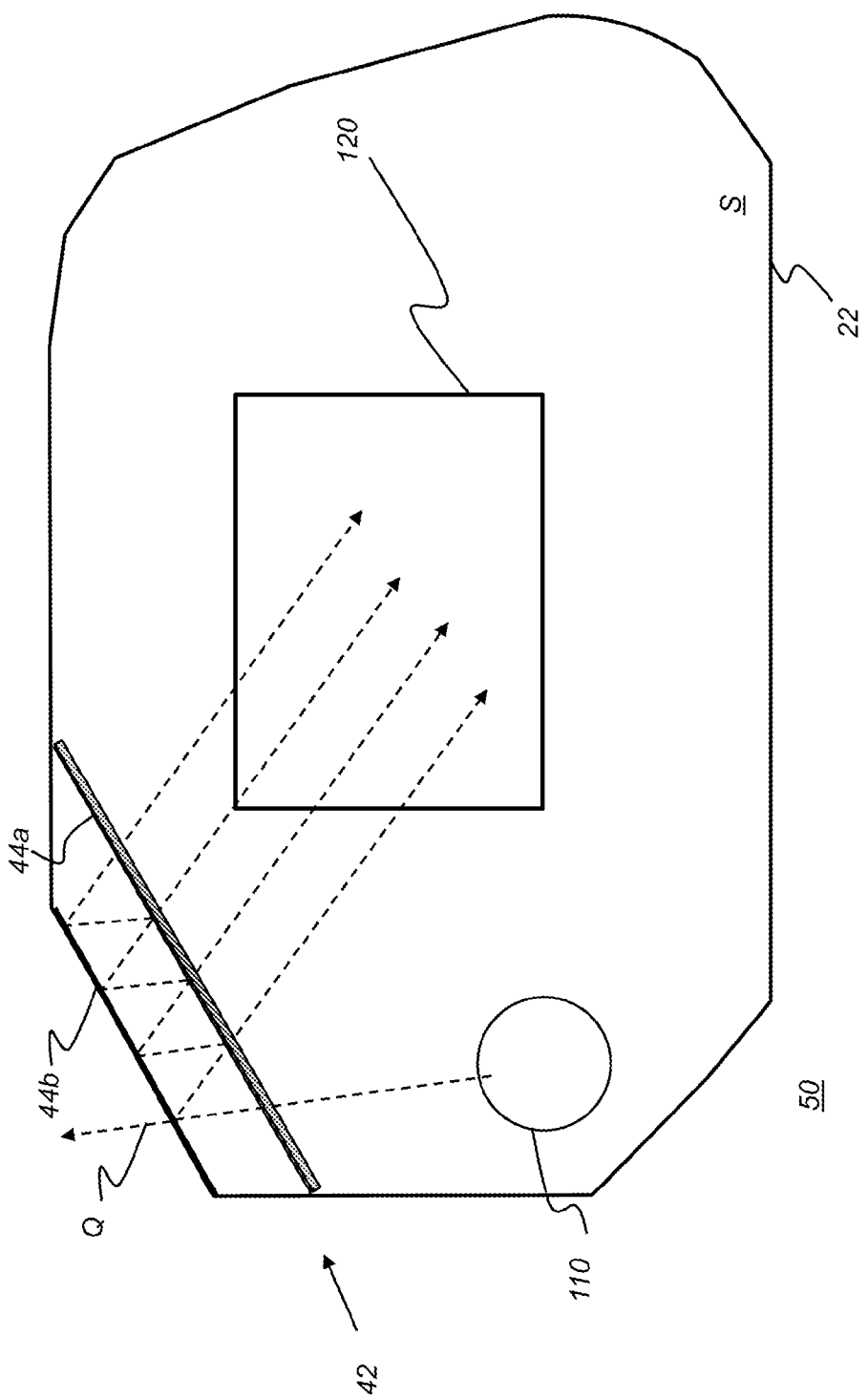
FIG. 6A is a plan view showing an imaging light guide that employs a gradient reflector array.

FIG. 6A shows an alternate embodiment of a light guide 50 arranged as a beam expander using waveguide guide 22 incorporating only two reflectors 44a and 44b in a boxed arrangement provided by a gradient reflector array 42. Reflector 44b comprises a dichroic filter with a nominal reflectance for desired wavelengths of visible light of 100%, while transmitting unwanted wavelengths of light Q. Reflector 44a has a gradient coating with varying reflectance along its length, distributing reflected light internal to reflector array 42 in order to provide beam expansion. The phrase "gradient reflectivity" indicates that the reflectivity value changes progressively, preferably in a continuously increasing or decreasing manner, but can also include more incremental changes in reflectivity as may be preferable for purposes of manufacture or optical performance. According to an embodiment of the present disclosure, the gradient reflectivity over a length portion of the reflector 44a continuously changes monotonically over a range from less than 10% reflectivity to greater than 50% reflectivity. Other ranges can also be provided to control the intensity profiles of the respective image-bearing light beams.

Figure 6B:
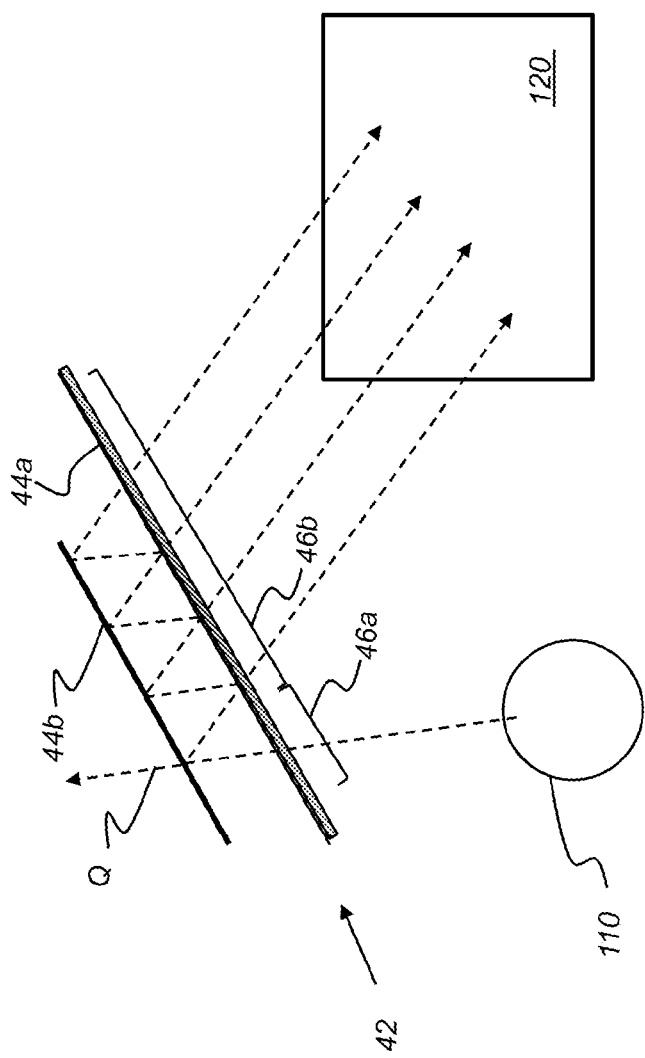
FIG. 6B is a schematic view showing how a gradient reflector array operates.

FIG. 6B is a schematic view, selectively omitting some of the waveguide 22 detail of FIG. 6A for clarity, showing how gradient reflector array 42 operates, repeatedly reflecting the light from in-coupling diffractive optic 110 with variably transmissive regions arranged in succession. Diffracted light output from in-coupling diffractive optic 110 initially passes through a fully transmissive region 46a of reflector 44a and is reflected by reflector 44b, which transmits any unwanted wavelengths as light Q and reflects the appropriate light back toward reflector 44a. A partially transmissive region 46b of reflector 44a is coated to provide a reflective gradient, by way of example, ranging from 75% reflective to less than 50% reflective along the length of reflector 44a. The light that is transmitted through reflector 44a is directed outward toward out-coupling diffractive optic 120. Reflector 44b reflects the incident light that had been reflected from region 46b back toward partially transmissive region 46b, over a segment of reflector 44a that is less reflective, such as 66% reflective in this example. Over the portion of reflector 44a that is 66% reflective, about ⅓ of incident light is then transmitted to another portion of out-coupling diffractive optic 120. A diminishing amount of light is repeatedly reflected back and forth between reflectors 44a and 44b until a final remnant of the image-bearing light from in-coupling diffractive optic 110 is transmitted to diffractive optic 120 through gradient reflector 44a.

Figure 6C:
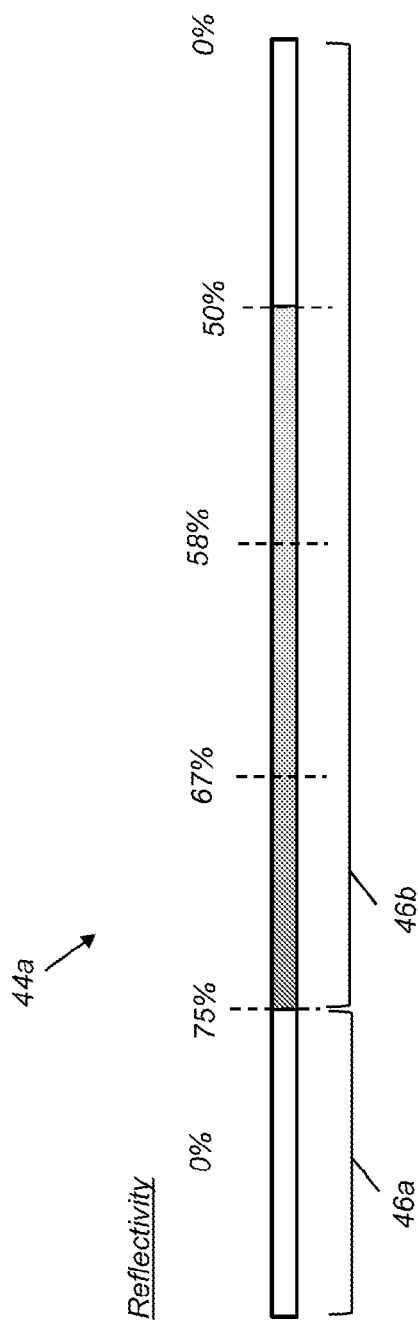
FIG. 6C is a plan view showing exemplary regions of a gradient reflector.

One possible overall arrangement of regions 46a and 46b of gradient reflector 44a is shown in side view in FIG. 6C. Dashed lines indicate local values of reflectivity along gradient reflector 44a. Reflector 44b can be formed along an edge of imaging light guide 22, for example. It can be readily appreciated that reflectivity values given herein for the FIG. 6A-6C examples illustrate the general principle for varying the reflectivity of gradient reflector 44a but are not to be considered restrictive. The reflectivity values that are actually used in any embodiment can depend on various factors including amount of light loss, coatings tolerances, and other performance variables, including a desired distribution of light within the image bearing light beams. Sub-regions having uniform reflectivity values, changing along the length of reflector 44a, could alternatively be provided.

The gradient reflectivity of reflector array 42 can provide an additional degree of freedom sensitive to inclination angle. While simply expanding the individual (pixel) beams helps to expand the eyebox, the typical eyebox remains much smaller than the size of the individual expanded beams because the expanded beams do not fully intersect at the eyebox. In order to more fully intersect at the eyebox, the individual beams, which propagate in different directions, must exit from different positions within the output grating. To improve the chances of intersection (i.e., overlap) in one dimension, certain angle beams can be directed more toward one side of the output grating than the other. To cause this, the gradient reflective surface can be made selectively more reflective to light of certain angles of incidence over other angles of incidence so that the different angles are directed toward different sides of the output grating. Using this method is complicated by the individual (pixel) beams being angularly encoded in two dimensions. Thus, the reflective sensitivity should be limited to just one of the dimensions.

For best performance, the beam expander optics as described above can provide each individual (pixel) beam with its own transverse distribution of energy so that most of the energy reaches the eyebox and non-overlapping portions of the beams contain less energy. The reflective surfaces of arrays 32 and 42 construct the output individual (pixel) beams as individual collections of relatively offset beam lets, where each beam let can vary in both intensity and position. Embodiments of the present disclosure allow the reflective intermediate beam expander to direct light toward out-coupling diffractive optic 120 through a range of angles spanning at least 90 degrees. The light can approach out-coupling diffractive optic 120 along either orthogonal axis of the image or somewhere in-between, such as at an oblique angle as shown in FIG. 5A. The capability for direction at an oblique angle can be advantageous for component positioning and packaging. In addition, the reflector arrays 32, 42 can provide for interconnecting the central field rays between the in-coupling and out-coupling diffractive optics 110, 120 at oblique angles while maintaining alignment with one of the orthogonal axes x, y of the image, particularly at the out-coupling diffractive optic.

Two-Channel Imaging Light Guide

Figure 7A:
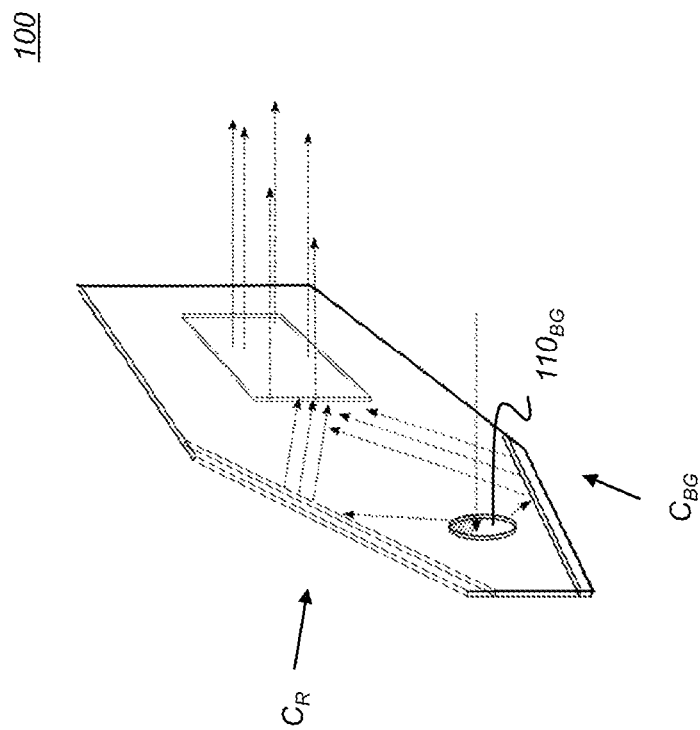
FIG. 7A is a perspective view that shows an embodiment of an imaging light guide having two color channels and formed on a single substrate.

FIG. 7A is a perspective view that shows an embodiment of an imaging light guide 100 having two color channels $C_R$ and $C_{BG}$ and formed on a single substrate. Color channels $C_R$ and $C_{BG}$ can be centered at wavelengths that are at least 50 nm apart, for example. Imaging light guide 100 is formed as a double-sided hybrid beam expander, with diffractive, reflective, and filtering components arranged to eliminate the need for stacked waveguide solutions in order to prevent color channel crosstalk. Image-bearing light for both color channels is incident on an in-coupling diffractive optic that separates the light into one of two color channels. Output image-bearing light from both channels is directed to a viewer eyebox E.

Figure 7B:
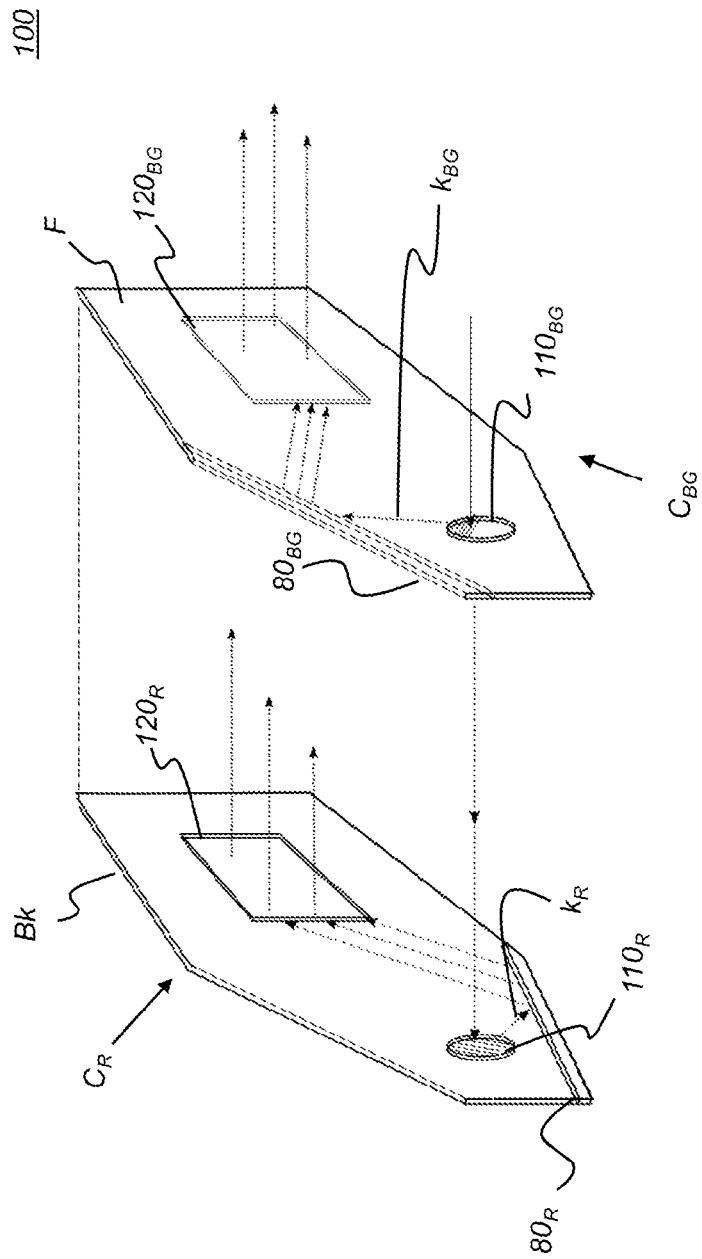
FIG. 7B is an exploded view showing the individual color channels of the imaging light guide of FIG. 7A.

FIG. 7B is an exploded view that shows an embodiment of an imaging light guide 100 of FIG. 7A having two color channels $C_{BG}$ and $C_R$ and formed on a single waveguide substrate. The exploded view visually separates components that are formed on the front surface F and back surface Bk of the waveguide substrate from each other. Each surface has the diffractive and reflective structures that serve one of the two color channels. In the example shown, one color channel $C_{BG}$ is provided for green and blue light (from about 450-550 nm); a second color channel $C_R$ is provided for red light (from about 610-780 nm). Color channel $C_{BG}$ has diffractive optic elements $110_{BG}$ and $120_{BG}$ formed on the front surface F of substrate S and has a reflector array $80_{BG}$. Color channel $C_R$ has diffractive optics $110_R$, $120_R$ and has a reflector array $80_R$ formed on the rear or back surface Bk of waveguide substrate S. Incident light is from a single direction, from right to left in the view of FIGS. 7A and 7B. Light of both color channels output from the out-coupling diffractive optics goes to viewer eyebox E. For the respective color channels, the in-coupling diffractive optics $110_R$ and $110_{BG}$ align with each other along a common normal to parallel front and back surfaces F and Bk. The out-coupling diffractive optics 1208 and $120_{BG}$ are similarly aligned. However, respective reflector arrays $80_{BG}$ and $80_R$ are not in alignment in accordance with the different color channel paths through the waveguide substrate S. The reflector arrays $80_R$ and $80_{BG}$ can have multiple surfaces with different reflectivity, as described previously with reference to reflector array 32 in FIGS. 4, 5A, and 5B. Alternately, one or both of the reflector arrays $80_R$ and $80_{BG}$ can be a gradient reflector array, as described with reference to array 42 in FIGS. 6A and 6B. The outermost reflective surface can be a dichroic filter that discards unwanted light of the opposite channel by transmission, so that opportunities for crosstalk between the two color channels are significantly reduced.

It should be noted that any of a number of alternate arrangements of color channels and their associated bandwidth ranges can be used, such as including green and red wavelength bands within one color channel and blue wavelength bands in another color channel.

Cross-Talk Concerns

Cross-talk between color channels can be a problem with any type of imaging system, including arrangements using multiple stacked waveguides, but is a particular concern for any type of design that uses a single waveguide. Approaches available to the designer for defeating crosstalk include providing separate the optical paths within the waveguide as much as is possible, both in terms of angle and of distance. For the example shown in FIGS. 7A and 7B, cross-talk is reduced by separating the path of the red light from the path of the blue-green light, so that "leakage" of light to the wrong color path does not occur or is negligible.

It is instructive to examine the behavior of different parts of the optical system in light of a cross-talk prevention strategy outlined above. Returning for a moment to the perspective view of FIG. 7B, it can be seen that the R and the BG light trace different paths from in-couplings 110, according to grating rotation, as indicated by their different grating vectors $k_R$ and $k_{BG}$. Even if some amount of crosstalk occurs at this point in the optical system, the dichroic filters provided by surface 34d (FIG. 5A, 5B embodiment) or surface 44b (FIG. 6A, 6B embodiment) can be treated to provide a filter characteristic in the corresponding color channel. For example, a low-pass filter for the red channel $C_R$ can be arranged for removing any blue-green light BG from the channel since this light is transmitted out of the waveguide rather than reflected. Similarly, a high-pass filter for blue-green color channel $C_{BG}$ can be arranged for removing any red light R from the channel since this light is transmitted out of the waveguide rather than reflected.

Additional color crosstalk reduction can be obtained by providing a suitable relative angle of gratings direction between in-coupling diffractive optics $110_R$ and $110_{BG}$. The grating direction, corresponding to the grating vector $k_R$ and $k_{BG}$ for each in-coupling 110, determines the path of light that is diffracted by each in-coupling. Peak separation between paths is achieved when the paths of R and BG light are orthogonal to each other. For example, FIG. 7B shows that the gratings rotation angles for the two color channels yield gratings vectors $k_R$, $k_{BG}$ that are 90 degrees apart from each other.

Figure 8:
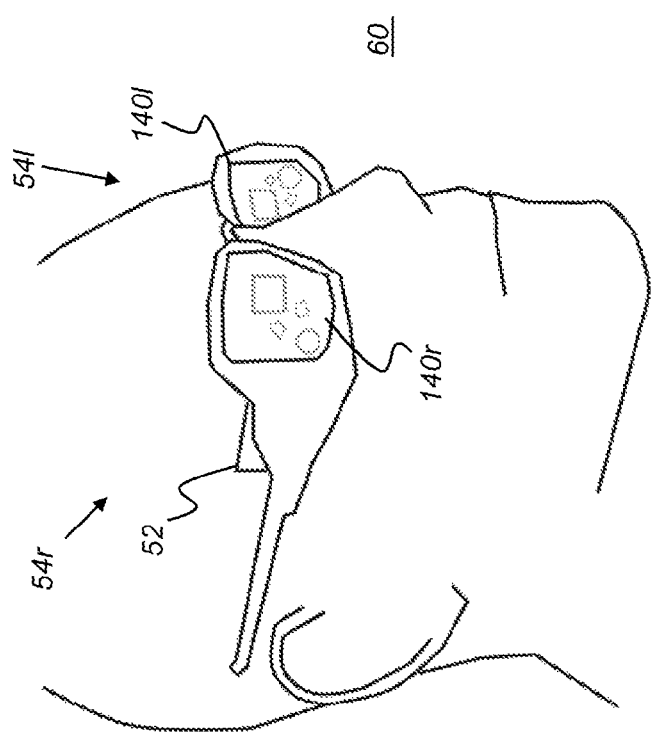
FIG. 8 is a perspective view that shows a display system for augmented reality viewing using imaging light guides of the present disclosure.

The perspective view of FIG. 8 shows a display system 60 for three-dimensional (3-D) augmented reality viewing using imaging light guides of the present disclosure. Display system 60 is shown as an HMD with a left-eye optical system 54l having a light guide 140l for the left eye and a corresponding right-eye optical system 54r having a light guide 140r for the right eye. An image source 52, such as a pico-projector or similar device, can be provided, energizable to generate a separate image for each eye, formed as a virtual image with an image orientation for upright image display. The images that are generated can be a stereoscopic pair of images for 3-D viewing. The virtual image that is formed by the optical system can appear to be superimposed or overlaid onto the real-world scene content seen by the viewer. Additional components familiar to those skilled in the augmented reality visualization arts, such as one or more cameras mounted on the frame of the HMD for viewing scene content or viewer gaze tracking, can also be provided.

Figure 9A:
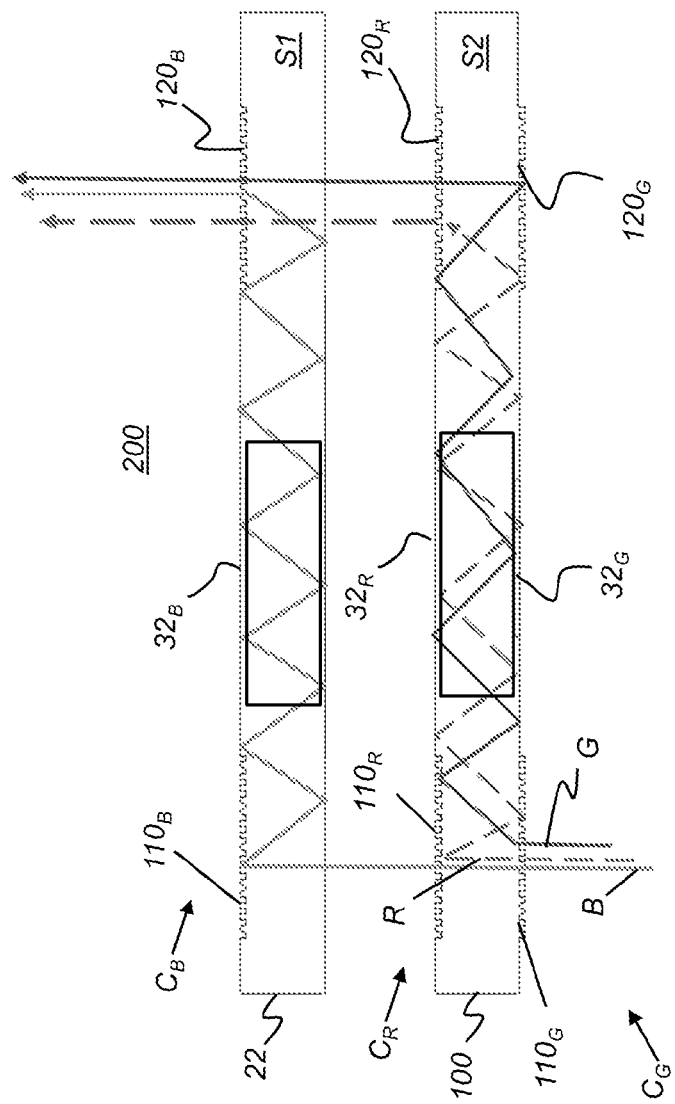
FIG. 9A is an exploded side view that shows a stacked imaging light guide assembly.
Figure 9B:
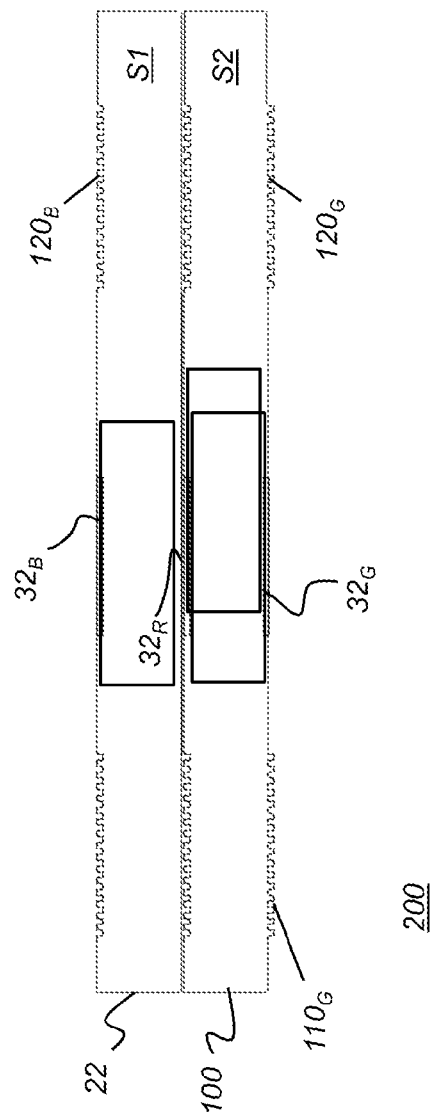
FIG. 9B is a side view that shows an assembled stacked imaging light guide assembly.

According to an alternate embodiment of the present disclosure, an imaging light guide is provided with three separate color channels, formed using a double-sided beam expander for first and second wavelength bands, and a second single-sided beam expander for the third wavelength band. The side view exploded view diagram of FIG. 9A and assembled view of FIG. 9B show, in simplified form and not intending to show actual scale, a stacked imaging light guide assembly 200 having a double-sided light guide 100 that is coupled with a single-sided imaging light guide 22. Light guides 100 and 22 are formed on separate waveguide substrates S1 and S2 that can be adhesively or mechanically coupled so that stacked imaging light guide assembly 200 provides three separate color channels. FIG. 9A shows one alternative arrangement, in which double-sided light guide 100 has a red channel $C_R$ for Red light R (in the 630-660 nm range) and a green channel $C_G$ for Green light G (in the 500-540 nm range); imaging light guide 22 then has a single blue channel $C_B$ for Blue light B (in the 440-470 nm range). FIG. 9A shows the paths of light in the respective color channels for this stacked arrangement. Blue light B transmits through both in-coupling diffractive optics $110_G$ and $110_R$ and is diffracted at in-coupling diffractive optic $110_B$. The diffracted blue B light is then conveyed through TIR in waveguide substrate S1, expanded along one axis by reflector array $32_B$, and directed to out-coupling diffractive optic 1208. The red light R is also input at in-coupling diffractive optic $110_G$, is diffracted reflectively at in-coupling diffractive optic $110_R$ and is expanded along one axis by reflector array $32_R$ and goes to out-coupling diffractive optic 1208. The green light G is also input at in-coupling diffractive optic $110_G$ and is diffracted there. This beam is conveyed through waveguide substrate S2 via TIR, expanded along one axis by reflector array $32_G$ and goes to out-coupling diffractive optic $120_G$. As with the two-channel embodiments described herein, the in-coupling diffractive optics on the double-sided beam expander used in a stacked arrangement are rotated so that their respective grating vectors are 25-40 degrees from each other within substrate S1. A sufficient air gap G is provided between substrates S1 and S2 to allow TIR It can be appreciated that the embodiment shown in FIGS. 9A and 9B is one of a number of possible arrangements of stacked imaging light guide assembly 200 and its color channels $C_R$, $C_G$, $C_B$. Double-sided light guide 100 can be stacked above or below single-sided imaging light guide 22. Coupling of two double-sided light guides 100 can provide four color channels in a similar manner.

Beam Expander Fabrication

In-coupling diffractive optics 110 and out-coupling diffractive optics 120 can be diffraction gratings or formed as volume holograms, or formed from a holographic polymer dispersed liquid crystal, for example. The waveguide substrate S of imaging light guide 100 is typically glass or other optical material with sufficient index of refraction for supporting TIR transmission between in-coupling diffractive optic 110 and out-coupling diffractive optic 120.

In-coupling diffractive optics 110 and out-coupling diffractive optics 120 have different grating periods appropriate to their respective color channels. Typically the grating pitch, or grating period, is a value from 75 to about 90 percent of the central wavelength for a color channel. For example, the in-coupling diffractive optic $110_R$ for the red channel (620-670 nm), in an exemplary embodiment, has a period of 510 nm, a depth of 205 nm, 50/50 fill, and a 45-degree slant.

After proper surface preparation of a glass substrate blank, the diffraction components can be formed on one or both outer surfaces of the imaging light guide using nano-imprinting methods, for example.

At least one of the in-couplings and out-couplings can be a surface relief diffraction grating.

Dichroic filters are a type of thin-film interference filter, which are treated or formed to provide a wavelength-selective filter characteristic as a result of the interference effects that take place between incident and reflected waves at boundaries between interleaved layers of materials having different refractive indices. Interference filters conventionally include a dielectric stack composed of multiple alternating layers of two or more dielectric materials having different refractive indices. In a conventional thin-film interference filter, each of the respective interleaved layers of the filter stack deposited on the substrate is very thin, e.g., having an optical thickness (physical thickness times the refractive index of the layer) on the order of one-quarter wavelength of light. A filter having a filter characteristic with reflection of at least one band of wavelengths and transmission of at least a second band of wavelengths immediately adjacent to the first band, such that the filter enables separation of the two bands of wavelengths by redirecting the reflected band, is conventionally called a "dichroic" filter.

Optical filters formed or configured according to embodiments of the present disclosure can generally employ the basic structure of a thin film interference filter. In this basic structure, a plurality of extremely thin discrete layers of material are deposited onto a surface of a substrate in some alternating or otherwise interleaved pattern as a filter stack, wherein the optical index between individual layers in the filter stack changes abruptly, rather than continuously or gradually. The plurality of layers include at least a number of first layers having a first refractive index $n_L$ interleaved with a number of second layers having a second refractive index $n_H$ that is greater than the first refractive index. One or more additional layers having refractive indices not equal to either $n_H$ or $n_L$ can also be in the filter stack. In conventional thin film designs, two discrete layers are alternated, formed with thicknesses very near the quarter-wavelength thickness of some fundamental wavelength. The addition of a third material or other additional materials in the thin film stack helps to fine-tune filter response. The numerical differences between the index of refraction in the high and low index of refraction materials affects the number of thin film layers required for forming a filter with a particular transmittance characteristic. Where the difference between the indices of refraction of the high and low index materials is large enough, fewer alternating layers are needed for achieving the same transmittance (density) values.

A wide variety of materials can be used to form the plurality of discrete material layers in the filter stack. Among such materials, non-limiting mention is made of metals, metallic and non-metallic oxides, transparent polymeric materials, and so-called "soft" coatings, such as sodium aluminum fluoride ($Na_3AlF_6$) and zinc sulfide (ZnS). Further non-limiting mention is made of metallic oxides chosen from silicon dioxide ($SiO_2$), tantalum pentoxide ($Ta_2O_5$), niobium pentoxide ($Nb_2O_5$), hafnium dioxide ($HfO_2$), titanium dioxide ($TiO_2$), and aluminum pentoxide ($Al_2O_5$). The interleaved material layers may include at least two distinct materials. As a non-limiting example, the filters can include a plurality of distinct alternating $Nb_2O_5$ and $SiO_2$ layers, which have indices of refraction of 2.3 and 1.5, respectively. Alternatively, filters in accordance with the present disclosure may use an interleaved pattern with at least three distinct materials, such as distinct $Nb_2O_5$, $SiO_2$, and $Ta_2O_5$ layers, each layer having a characteristic index of refraction. Of course, more than three materials and other combinations of materials may also be used within the interleaved layer pattern.

Generally, the filters in accordance with the present disclosure can be manufactured using deposition methods and techniques that are well known to those skilled in the optical coatings art. For example, these filters may be made with a computer controlled ion beam sputtering system, capable of depositing a plurality of discrete alternating material layers, wherein the thickness of each layer may be precisely controlled.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. An imaging light guide for conveying image-bearing light beams, comprising:
   a waveguide;
   a first color channel operable to direct light of a first wavelength band through the waveguide comprising:
   (i) a first in-coupling diffractive optic disposed to diffract image-bearing light beams of the first wavelength band into the waveguide along a first direction;
   (ii) a first reflector array having at least one partially reflective surface and a dichroic filter surface oriented in parallel with the at least one partially reflective surface, wherein surfaces of the first reflector array are disposed to expand the respective image-bearing light beams from the first in-coupling diffractive optic in a first dimension and to direct the expanded image-bearing light beams toward a first out-coupling diffractive optic;
   (iii) the first out-coupling diffractive optic disposed to further expand the imagebearing light beams of the first wavelength band in a second dimension and to direct the further expanded image-bearing light beams of the first wavelength band from the waveguide toward a viewer eyebox;
   a second color channel operable to direct light of a second wavelength band through the waveguide comprising:
   (i) a second in-coupling diffractive optic disposed to diffract image-bearing light beams of the second wavelength band into the waveguide along a second different direction;
   (ii) a second reflector array having at least one partially reflective surface and a dichroic filter surface in parallel with the at least one partially reflective surface, wherein surfaces of the second reflector array are disposed to expand the respective image-bearing light beams from the second incoupling diffractive optic in the first dimension and to direct the expanded image-bearing light beams toward a second out-coupling diffractive optic; and
   (iii) the second out-coupling diffractive optic disposed to further expand the image-bearing light beams of the second wavelength band in the second dimension and to direct the further expanded image-bearing light beam of the second wavelength band from the waveguide toward the viewer eyebox.

2. The imaging light guide of claim 1 wherein the dichroic filter surface of the second reflector array is an outermost surface of the second reflector array, and wherein the dichroic filter surface is formed to transmit light beams of the first wavelength band out of the waveguide and reflect light of the second wavelength band toward the at least one partially reflective surface of the second reflector array.

3. The imaging light guide of claim 1 wherein the first in-coupling diffractive optic and the second in-coupling diffractive optic are formed on opposite surfaces of the waveguide and aligned along a common normal to the opposite surfaces, and wherein the first reflector array and the second reflector array are disposed in different positions in the waveguide.

4. The imaging light guide of claim 3 wherein the first out-coupling diffractive optic and the second out-coupling diffractive optic are formed on the opposite surfaces of the waveguide and aligned along a common normal to the opposite surfaces.

5. The imaging light guide of claim 1 wherein the first in-coupling diffractive optic is a volume hologram.

6. The imaging light guide of claim 1 wherein the first in-coupling diffractive optic is a diffraction grating.

7. The imaging light guide of claim 1 in which the waveguide is a planar waveguide having opposite side surfaces oriented in parallel.

8. The imaging light guide of claim 1, wherein the dichroic filter surface of the first reflector array is an outermost surface of the first reflector array, and wherein the dichroic filter surface is formed to transmit light beams of a second wavelength band out of the waveguide and reflect light of the first wavelength band toward the at least one partially reflective surface.

9. The imaging light guide of claim 1, wherein the first in-coupling diffractive optic has a first grating vector and the second in-coupling diffractive optic has a second grating vector, and wherein the first and second grating vectors are positioned at a 25-40 degree angle with respect to each other.

10. The imaging light guide of claim 1, wherein the waveguide is a first waveguide, and a second waveguide is coupled to the first waveguide, wherein the second waveguide comprises a third color channel operable to direct light of a third wavelength band through the second waveguide.

11. The imaging light guide of claim 10, wherein the third color channel comprises:
(i) a third in-coupling diffractive optic disposed to diffract image-bearing light beams of the third wavelength band into the second waveguide;
(ii) a third reflector array having at least one partially reflective surface and a dichroic filter surface in parallel with the at least one partially reflective surface, wherein the surfaces of the third reflector array are disposed to expand the respective image-bearing light beams from the third in-coupling diffractive optic and to direct the expanded image-bearing light beams toward a third out-coupling diffractive optic; and
(iii) the third out-coupling diffractive optic disposed to further expand the image-bearing light beams of the third wavelength band and to direct the further expanded image-bearing light beams of the third wavelength band from the second waveguide toward the viewer eyebox.

12. The imaging light guide of claim 11, wherein the dichroic filter surface of the third reflector array is formed to reflect light of the third wavelength band toward the at least one partially reflective surface of the third reflector array and to transmit other light.

13. The imaging light guide of claim 11, wherein the image-bearing light beams of the third wavelength band are transmitted through the first in-coupling diffractive optic and the second in-coupling diffractive optic before the image-bearing light beams of the third wavelength range are incident upon the third in-coupling diffractive optic.

14. The imaging light guide of claim 11, wherein the image-bearing light beams of the second wavelength band are transmitted through the first in-coupling diffractive optic before the image-bearing light beams of the second wavelength band are incident upon the second in-coupling diffractive optic.

15. The imaging light guide of claim 10, wherein the second waveguide is coupled with the first waveguide via an adhesive.

* * * * *